United States Patent
McAllister et al.

(10) Patent No.: US 8,670,613 B2
(45) Date of Patent: Mar. 11, 2014

(54) LOSSLESS FRAME BUFFER COLOR COMPRESSION

(75) Inventors: David K. McAllister, Holladay, UT (US); Alexandre Joly, Sunnyvale, CA (US); Peter Tong, Cupertino, CA (US)

(73) Assignee: NVIDIA Corporation, Santa Clara, CA (US)

( * ) Notice: Subject to any disclaimer, the term of this patent is extended or adjusted under 35 U.S.C. 154(b) by 776 days.

(21) Appl. No.: 12/872,998

(22) Filed: Aug. 31, 2010

(65) Prior Publication Data
US 2012/0050303 A1    Mar. 1, 2012

(51) Int. Cl.
*G06K 9/36* (2006.01)

(52) U.S. Cl.
USPC ................................. 382/166; 382/323

(58) Field of Classification Search
None
See application file for complete search history.

(56) References Cited

U.S. PATENT DOCUMENTS

| | | | |
|---|---|---|---|
| 2003/0012278 A1* | 1/2003 | Banerji et al. | 375/240.12 |
| 2007/0237228 A1* | 10/2007 | Han et al. | 375/240.12 |
| 2008/0018794 A1* | 1/2008 | Fung | 348/612 |

OTHER PUBLICATIONS

Strom, et al. "Floating-Point Buffer Compression in a Unified Codec Architecture," Graphics Hardware (2008). The Eurographics Association. 10pgs.
Strom, et al. "ETC2: Texture Compression Using Invalid Combinations," Graphics Hardware (2007). 7pgs.

* cited by examiner

*Primary Examiner* — Nirav G Patel
(74) *Attorney, Agent, or Firm* — Patterson & Sheridan, LLP

(57) ABSTRACT

One embodiment of the present invention sets forth a technique for lossless compression of color data. Color data for a packet including multiple sub-pixel samples is compressed using a predictor map that is selected based on the sampling format specified for the graphics surface storing the color data. The predictor map defines one of the samples as an anchor that is represented exactly and a transform indicating which neighboring samples are used to compute difference samples for the other samples in the packet. The difference samples are truncated and tested to determine if the difference samples can fit into one or more compressed data formats, i.e., if the color data can be compressed without loss. When compression can be performed without loss, the transformed packet is output. Otherwise, the original packet is output.

21 Claims, 9 Drawing Sheets

LOSSLESS FRAME BUFFER COLOR COMPRESSION

BACKGROUND OF THE INVENTION

1. Field of the Invention

The present invention generally relates to graphics processing and more specifically to lossless compression of color data.

2. Description of the Related Art

Conventional graphics processors use compression to reduce the bandwidth needed to access the color data stored in the frame buffer. Some forms of compression produce compressed color data that cannot be reliably decompressed to produce the original color data. The resulting loss of color data introduced during compression may produce visual artifacts when the color data is decompressed.

Accordingly, what is needed in the art is a system and method for compressing color data without losing any of the original color data.

SUMMARY OF THE INVENTION

A system and method for lossless compression of color data does not introduce visual artifacts. Color data for a packet including multiple sub-pixel samples is compressed using a predictor map that is selected based on the sampling format specified for the graphics surface storing the color data. The predictor map defines one of the samples as an anchor that is represented exactly and a transform that indicates which neighboring samples are used to compute difference samples for the other samples in the packet. The difference samples are truncated and is tested to determine if the difference samples can fit into one or more compressed data formats, i.e., if the color data can be compressed without loss. When compression can be performed without loss, the transformed packet is output. Otherwise, the original packet is output.

Various embodiments of a method of the invention for compressing color data include receiving the color data for a packet including multiple samples and selecting a predictor map based on a sampling mode of a graphics surface, where the predictor map identifies one of the multiple samples in the packet as an anchor that is represented exactly and a neighboring sample for each one of the other samples in the packet. Per-channel differences between each neighboring sample and the other samples are calculated to produce difference samples. The difference samples are truncated to produce truncated difference samples. The truncated difference samples and the anchor are encoded in a compressed color data format to produce output color data for the packet and the output color data is stored in a portion of memory allocated to the graphics surface.

Various embodiments of the invention include a system for compressing color data. The system includes a processor that is configured to receive the color data for a packet including multiple samples and select a predictor map based on a sampling mode of a graphics surface, where the predictor map identifies one of the multiple samples in the packet as an anchor that is represented exactly and a neighboring sample for each one of the other samples in the packet. The processor that is configured to compute per-channel differences between each neighboring sample and the other samples to produce difference samples, truncate the difference samples to produce truncated difference samples. The processor that is configured to encode the truncated difference samples and the anchor in a compressed color data format to produce output color data for the packet and store the output color data in a portion of a frame buffer allocated to the graphics surface.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
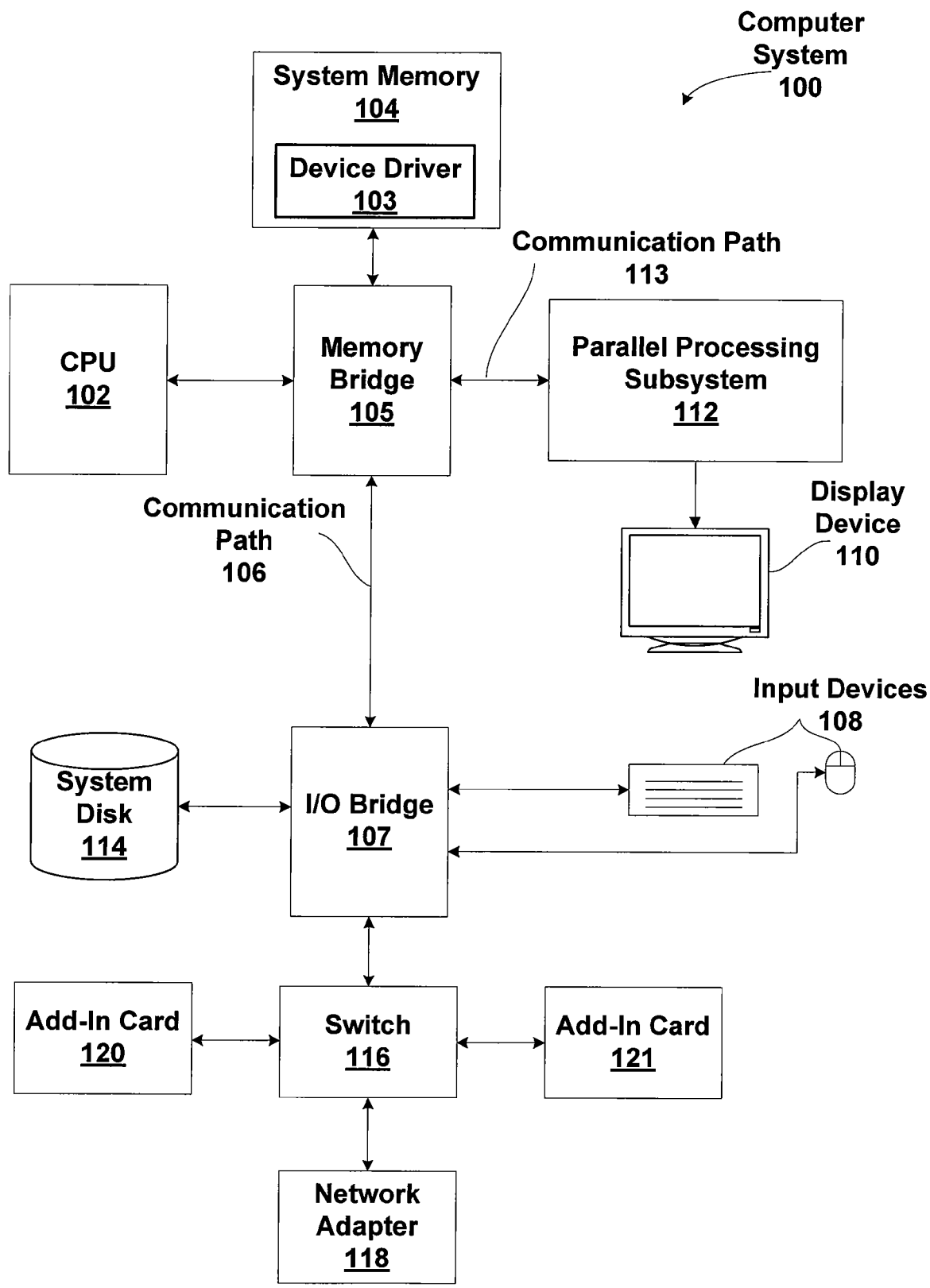
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
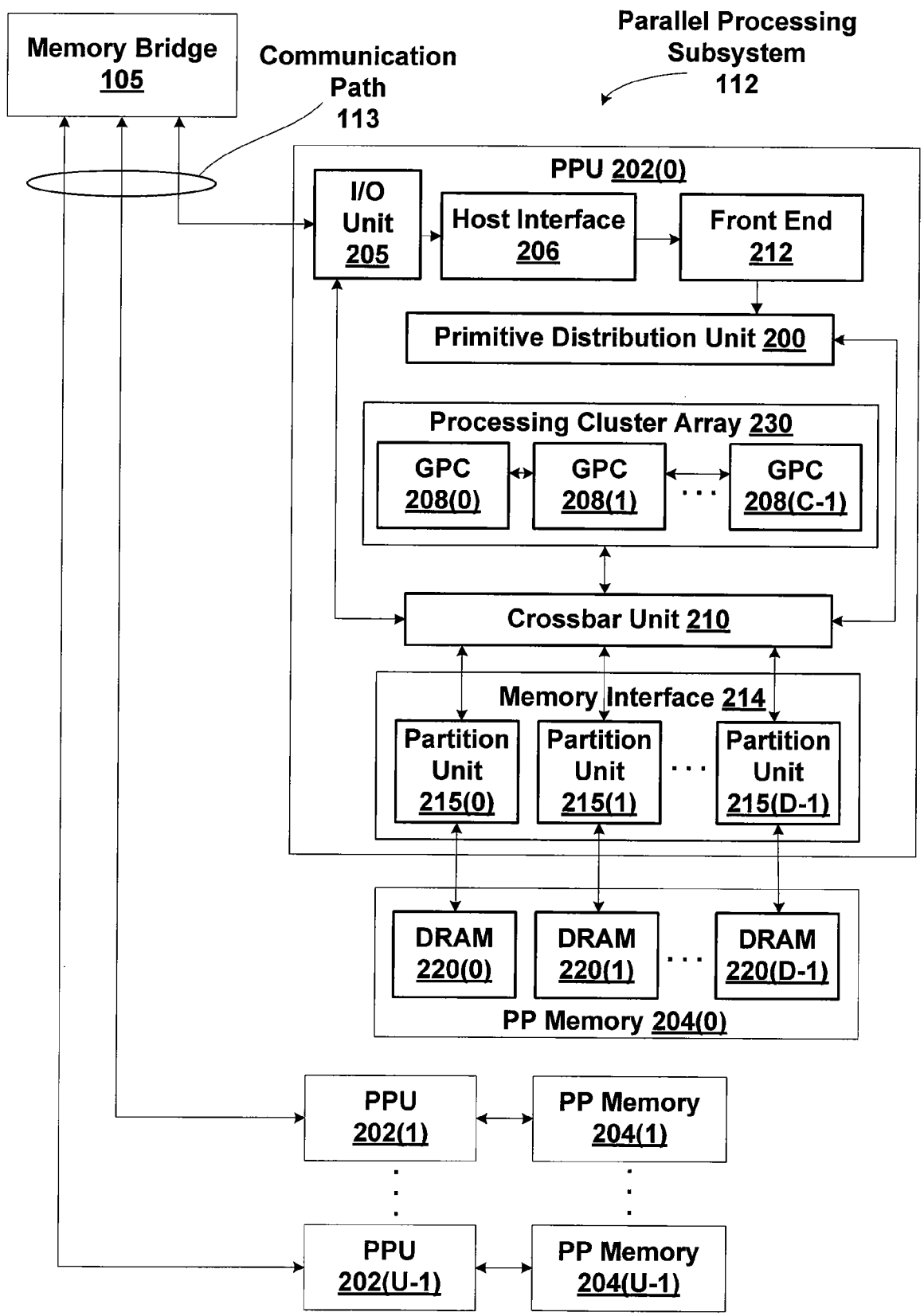
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where $U \geq 1$. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where $C \geq 1$. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a primitive distribution unit 200, which receives commands defining processing tasks from front end unit 212. Processing tasks include indices of data to be processed, e.g., surface (patch) data, primitive data, as well as state parameters and commands defining how the data is to be processed (e.g., what program is to be executed). Primitive distribution unit 200 may be configured to fetch the indices corresponding to the data, or primitive distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A primitive distribution unit 200 may be configured to produce tasks at a frequency capable of providing tasks to multiple GPCs 208 for processing. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen-space to produce a rendered image. Intermediate data produced by GPCs 208, such vertex attributes, may be stored in buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
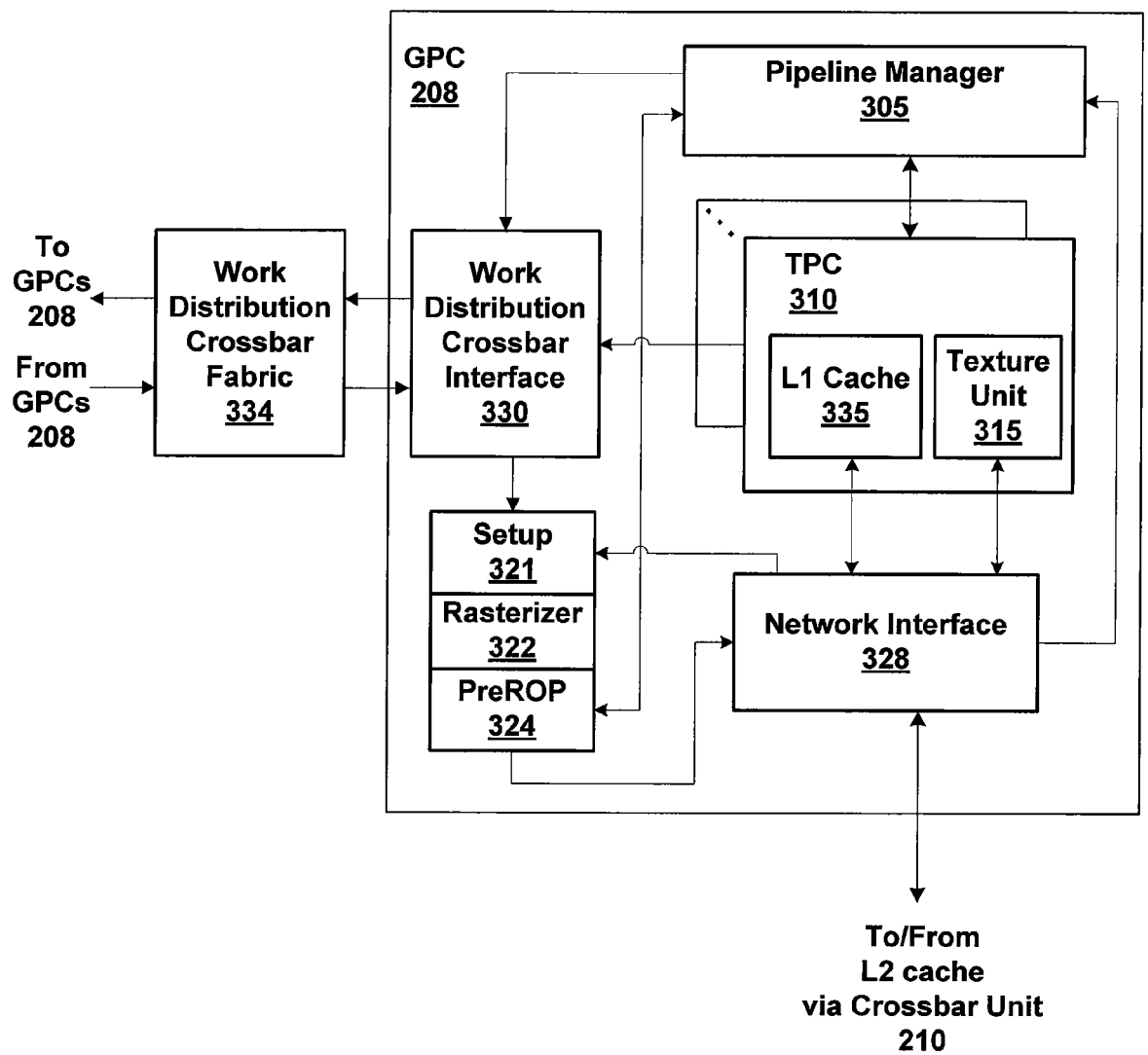
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

The primitive distribution unit 200 distributes processing tasks to each TPC 310 within the GPCs 208 via crossbar unit 210. In particular the primitive distribution unit 200 distributes primitives for object-space (geometry) processing by the TPCs 310. A pipeline manager 305 within each GPC 208 distributes the object-space processing tasks to streaming multiprocessors within each of the TPCs 310. Pipeline manager 305 may also be configured to control a work distribution crossbar interface 330 to distribute state parameters and commands to the TPCs 310 for object-space processing and screen-space processing.

In one embodiment, each GPC 208 includes a number M of TPCs 310, where M≥1, each TPC 310 configured to process one or more thread groups. Also, each TPC 310 advantageously includes an identical set of functional execution units (e.g., arithmetic logic units, and load-store units, and the like) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an TPC 310 is referred to herein as a "warp" or "thread group." As used herein, a "thread group" refers to a group of threads concurrently executing the same program on different input data, with one thread of the group being assigned to a different processing engine within a TPC 310. A thread group may include fewer threads than the number of processing engines within the TPC 310, in which case some processing engines will be idle during cycles when that thread group is being processed. A thread group may also include more threads than the number of processing engines within the TPC 310, in which case processing will take place over multiple clock cycles. Since each TPC 310 can support up to G thread groups concurrently, it follows that up to G*M thread groups can be executing in GPC 208 at any given time.

Additionally, a plurality of related thread groups may be active (in different phases of execution) at the same time within a TPC 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the TPC 310, and m is the number of thread groups simultaneously active within the TPC 310. The size of a CTA is generally determined by the programmer and the amount of hardware resources, such as memory or registers, available to the CTA.

Each TPC 310 contains an L1 cache 335 or uses space in a corresponding L1 cache outside of the TPC 310 that is used to perform load and store operations. Each TPC 310 also has access to L2 caches within the partition units 215 that are shared among all GPCs 208 and may be used to transfer data produced during object-space primitive processing to TPCs 310 to perform screen-space primitive processing. Finally, TPCs 310 also have access to off-chip "global" memory, which can include, e.g., parallel processing memory 204 and/or system memory 104. It is to be understood that any memory external to PPU 202 may be used as global memory. Additionally, an L1.5 cache may be included within the GPC 208, configured to receive and hold data fetched from memory via memory interface 214 requested by TPC 310, including instructions, uniform data, and constant data, and provide the requested data to TPC 310. Embodiments having multiple TPCs 310 in GPC 208 beneficially share common instructions and data cached in an L1.5 cache.

Each GPC 208 includes a network interface 328 that may be configured to map virtual addresses into physical addresses. In other embodiments, the mapping of virtual addresses into physical addresses may be performed within the memory interface 214. A set of page table entries (PTEs) is used to map a virtual address to a physical address of a tile and optionally a cache line index. Address translation lookaside buffers (TLB) or caches which may reside within a TPC 310 or the L1 cache 335 or GPC 208. The physical address is processed to distribute render target data access locality to allow efficient request interleaving among partition units. The cache line index may be used to determine whether or not a request for a cache line is a hit or miss.

A GPC 208 may be configured such that each TPC 310 includes a texture unit 315 for performing texture mapping operations, e.g., determining texture sample positions, reading texture data, and filtering the texture data. Texture data is read from a texture L1 cache or in some embodiments from the L1 cache 335 within TPC 310 and is fetched from an L2 cache, parallel processing memory 204, or system memory 104, as needed.

As previously explained, TPCs 310 receive batches of primitives and perform object-space processing. Each TPC 310 outputs a stream of object-space processed primitive descriptors to the work distribution crossbar interface 330 in order to redistribute the object-space processed primitive descriptors via the work distribution crossbar fabric 334 to one or more GPCs 208 for screen-space processing. A primitive descriptor includes the primitive type (triangle strip, triangle mesh, line, and the like), flags, and indices of vertices. The object-space processing includes one or more of vertex shading, tessellation shading, and geometry shading. The screen-space processing is rasterization of the primitives, and may include one or more of scan conversion, shading, depth/stencil operations, and blending. TPC 310 may also output the object-space processed primitive data, i.e., vertex attributes, for storage in an L2 cache, parallel processing memory 204, or system memory 104 via crossbar unit 210.

A preROP (pre-raster operations) 324 is configured to receive data (screen-space processed primitives) from TPC 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., TPCs 310, setup units 321, rasterizers 322, or preROPs 324 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
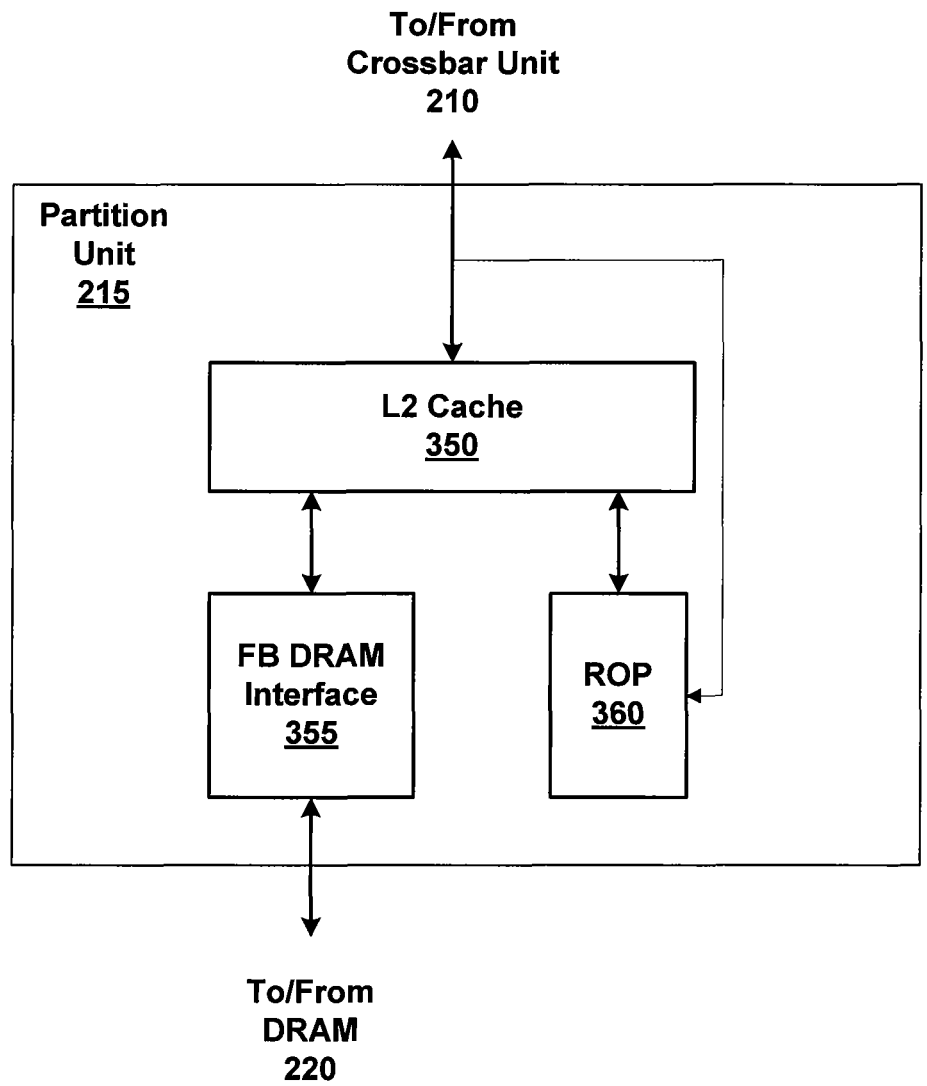
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. Each partition unit 215 includes a ROP 360 in order to distribute processing of the raster operations. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. ROP 360 receives color and z fragment data from the GPCs 208 and may be configured to compress z or color data that is written to memory and decompress z or color data that is read from memory. In some embodiments of the present invention, ROP 360 is included within each GPC 208 instead of partition unit 215, and pixel read and write requests are transmitted over crossbar unit 210 instead of pixel fragment data.

Persons skilled in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

Graphics Pipeline Architecture

Figure 4:
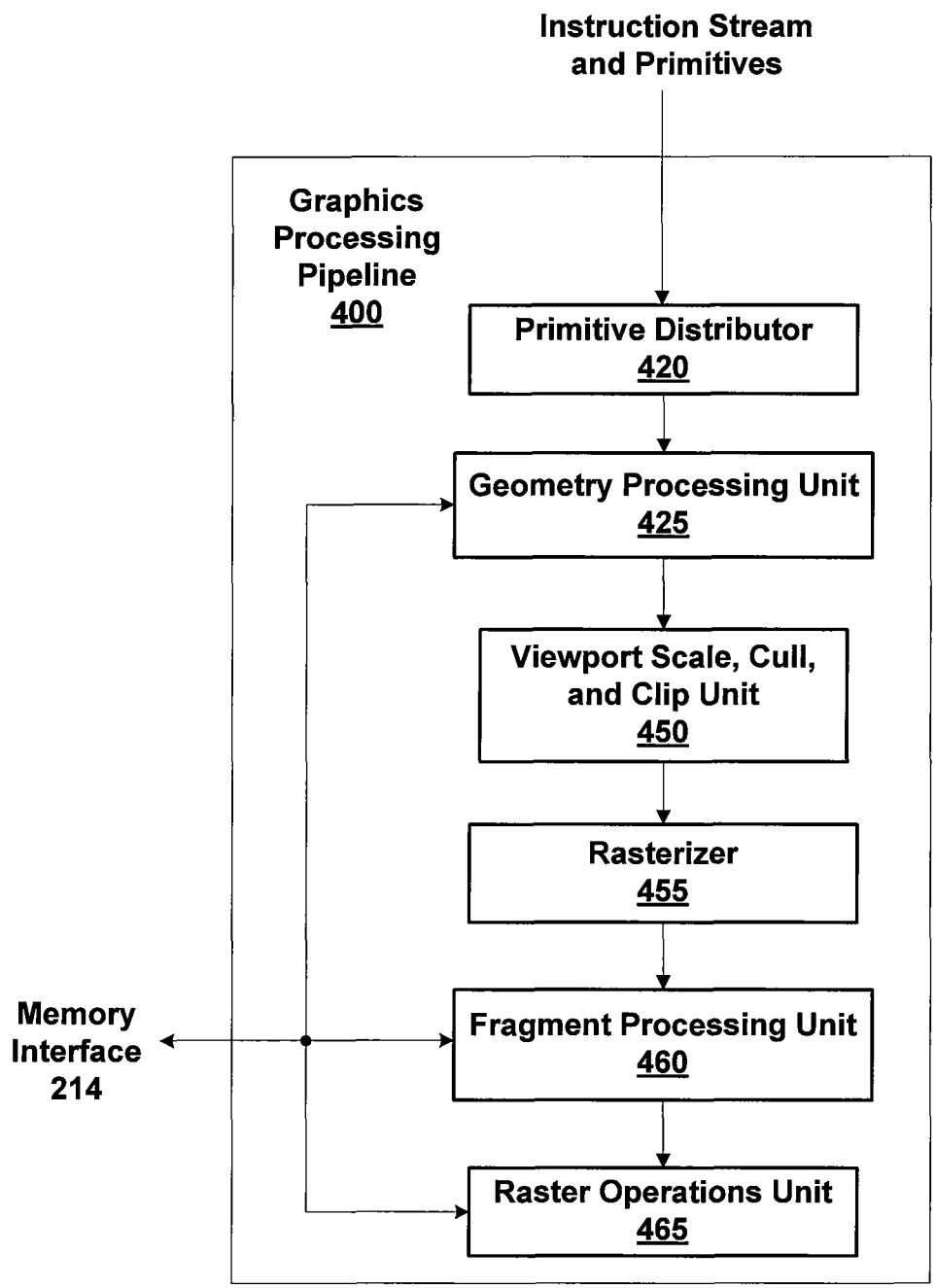
FIG. 4 is a conceptual diagram of a graphics processing pipeline that one or more of the PPUs of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the TPCs 310 may be configured to perform the functions of one or more of a geometry processing unit 425, and a fragment processing unit 460. The functions of primitive distributer 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Vertex data for high-order surfaces, primitives, and the like may be stored in in L1 cache 335, parallel processing memory 204, or system memory 104 and accessed as needed to render the primitives. The functions of the primitive distributer 420 may be performed by the primitive distribution unit 200. Primitive distributer 420 receives pointers to primitive index lists stored in memory. The entries in these index lists point into lists of vertex attributes (vertex buffers), also stored in memory. Because primitives are stored compactly and many primitives can be passed to the primitive distributer 420 in a single draw call, indexed primitive lists and vertex buffers are the most efficient way to convey geometry to the graphics pipeline 400. The front end 212 may be configured to store legacy inline and immediate mode vertices in vertex buffers, so the primitive assembler 420 only has to deal with this one, efficient type of primitive input data, namely primitive index lists. In other embodiments the primitive distributer 420 may receive the vertex data instead of pointers to primitive index lists.

In some embodiments, the GPCs 208 are configured to perform tessellation processing prior to geometry processing. In those embodiments the primitive distributer 420 distributes batches of primitives for tessellation processing to multiple TPCs 310 and streams of tessellated primitive batches are produced.

Primitive distributer 420 dices the index list into self-contained batches of indices specifying up to J vertices and K primitives, such that each vertex in a strip, after the first two, specifies a new triangle. In some embodiments, J is 32, K is 30, and batches may occupy from one to four 32B data packets, depending on the number and type of primitive and contain the following information: indices of vertices in the vertex buffer and topology information (which vertices in the batch comprise each primitive). Importantly, the primitive distributer 420 works entirely with primitive indices—it does not touch the vertex data itself. The vertex data is later fetched by the TPC 310 assigned for vertex shading.

Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory.

The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Lossless Color Compression

The color data that is written to memory may be compressed without loss in order to reduce the bandwidth needed to read and write the frame buffer. The ROP 360 of FIG. 3 may be configured to compress packets that include multiple sub-pixel samples using a predictor map. The predictor map defines one of the samples in each packet as an anchor that is represented exactly. The predictor map also defines a transform indicating which neighboring samples are used to compute difference samples for the other samples (non-anchor samples) in the packet. The predictor map may be selected from a variety of predictor maps based on the sampling format specified for the graphics surface storing the color data.

Figure 5A:
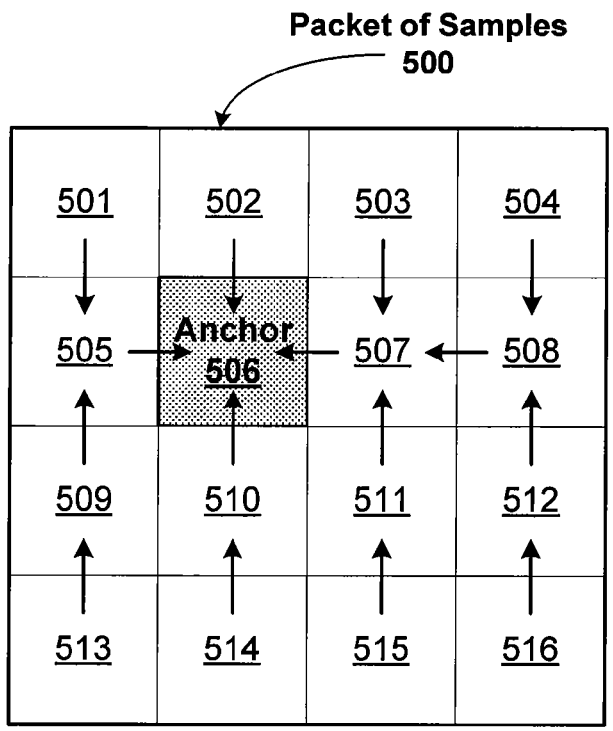
FIG. 5A is a diagram of a predictor map for a packet of samples, according to one embodiment of the present invention.

FIG. 5A is a diagram of a predictor map for a packet of samples 500, according to one embodiment of the present invention. The packet of samples 500 may represent one or more pixels, depending on the sampling mode of the graphics surface that is specified as the destination for the packet of samples. For example, when the sampling mode is 1 sample per pixel, the number of pixels included in the packet of samples 500 is 16. When the sampling mode is 16 samples per pixel, the number of pixels included in the packet of samples 500 is 1. Other sampling modes may specify 2, 4, or 8 samples per pixel for a graphics surface.

The predictor map defines the sample 506 as the anchor and arrows between the samples define the transform that indicates a neighbor sample for each of the other (non-anchor) samples. For example, samples 505, 506 (anchor), 507, and 508 are neighbors for samples 501 and 509, 502 and 510, 503 and 511, and 504 and 512, respectively. Similarly, samples 509, 510, 511, and 512 are neighbors for samples 513, 514, 515, and 516, respectively. Finally, anchor 506 is the neighbor for samples 505 and 507 and sample 507 is the neighbor for sample 508. Note that the neighbor for each sample is closer to the anchor 506 than the sample associated with the neighbor. Note also that the anchor 506 is not one of the samples positioned on the perimeter of the packet of samples 500 in screen space. Specifically, none of the perimeter samples, e.g., sample 501, 501, 503, 504, 508, 512, 516, 515, 514, 513, 509, or 505 is defined as the anchor.

Figure 5B:
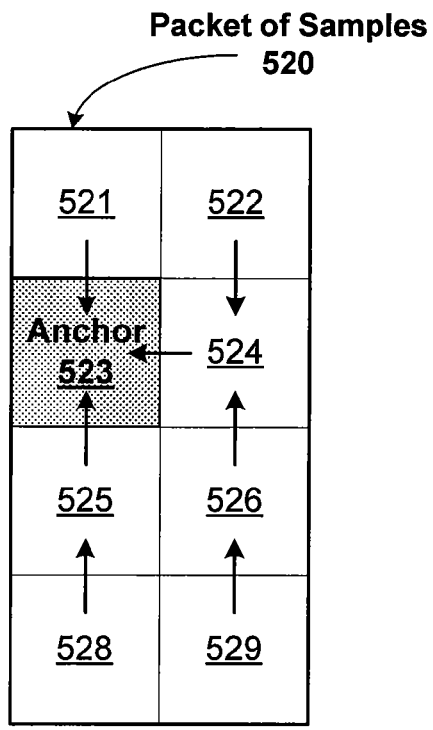
FIG. 5B is a diagram of another predictor map for a packet of samples, according to one embodiment of the present invention.

FIG. 5B is a diagram of another predictor map for a packet of samples 520, according to one embodiment of the present invention. Each of the samples in the packet of samples 520 includes twice as many bits compared with the samples in the packet of samples 500. For examples, packet of samples 500 may include 8 bits for each channel, e.g., red (R), green (G), blue (B), and alpha (A), of each sample and packet of samples 520 may include 16 bits for each channel of each sample. The 16 bit values may be fixed point or floating point format, signed or unsigned. A signed format may be used to store graphics data such as height fields, bump/displacement maps, normal maps, and the like. In some embodiments, signed floating point values are biased to eliminate the discontinuity that exists at zero for floating point format numbers. A biased floating point value is computed by treating the bit representation as twos-complement fixed point and if for negative numbers computing output=$2^{16}$−input and otherwise as output=$2^{15}$+input, where the input is not biased and the output is the biased floating point value. Note that a carry is not performed and the computed biased floating point value is stored as 16 bits.

The predictor map for the packet of samples 520 defines the sample 523 as the anchor and arrows between the samples define the transform that indicates a neighbor sample for each of the other (non-anchor) samples. For example, samples 524, 522 (anchor) are neighbors for samples 522 and 526 and samples 521 and 525, respectively. Samples 526 and 525 are neighbors for samples 529 and 528, respectively. In other embodiments, the packet size may be increased so that more samples are included in each pixel. In those embodiments, the anchor for a packet of samples that includes 16 bits per-channel may be defined as a sample that is not positioned on the perimeter of the packet in screen space.

Figure 5C:
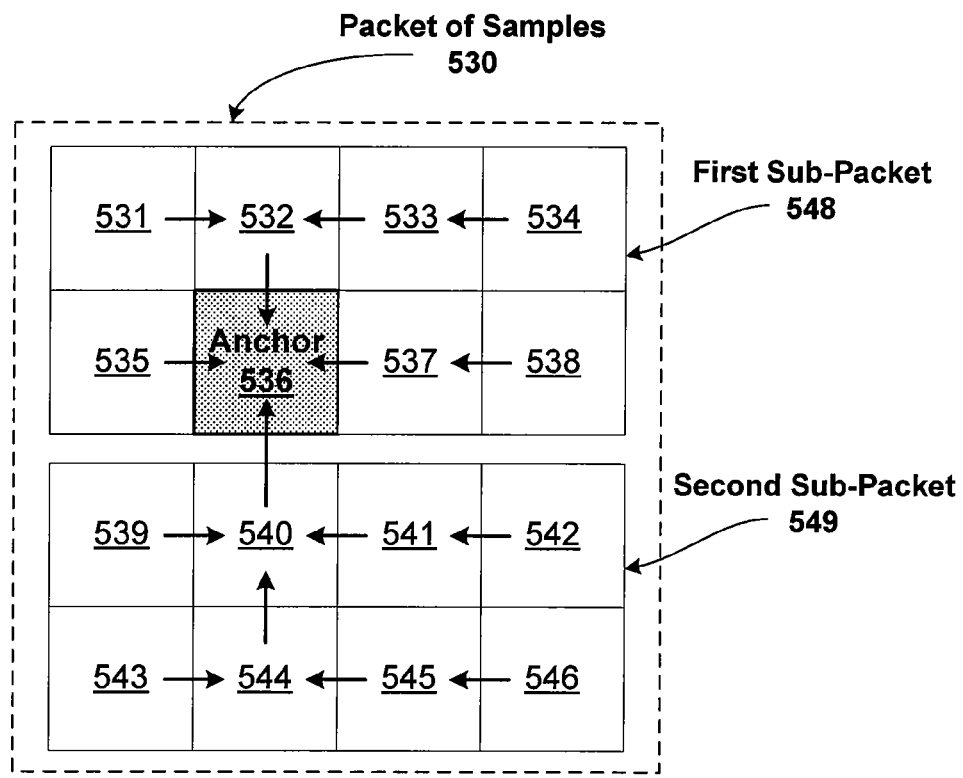
FIG. 5C is a diagram of another predictor map for a packet of samples, according to one embodiment of the present invention.

FIG. 5C is a diagram of another predictor map for a packet of samples 530, according to one embodiment of the present invention. The packet is divided into two sub-packets, a first sub-packet 548 and a second sub-packet 549. Sub-packets 548 and 549 may be processed in parallel or serially in order to produce an output packet. The packet of samples 530 may be represented in any number of bits for each channel.

For graphics surfaces having aliased or multi-sample anti-aliased (MSAA) sampling modes, the source data has only one color value per pixel, i.e., the one or more samples within each pixel have the sample color value. For graphics surfaces that use a supersampling anti-aliased (SSAA) sampling mode, the source data is per sample since each sample may have a different color value. In order to take advantage of the MSAA sampling modes, the predictor map may be configured to define neighbors that are within the sample pixel as the associated samples whenever possible. The predictor map shown in FIG. 5C is configured for use when the MSAA sampling mode is 8 samples per pixel, where the first sub-packet 548 includes 8 samples of a first pixel and the second sub-packet 549 includes 8 samples of a second pixel.

The predictor map defines the sample 536 as the anchor and arrows between the samples define the transform that indicates a neighbor sample for each of the other (non-anchor) samples. For example, sample 532 is a neighbor for samples 531 and 533, and 536 (anchor) is a neighbor for samples 532, 535, 537, and 540. Only one sample in a first sub-packet 548, anchor 536 is defined as the neighbor of any of the samples in the second sub-packet 549 in order to minimize the dependencies between the first sub-packet 548 and the second sub-packet 549. Therefore, the first sub-packet 548 and the second sub-packet 549 may be computed in parallel or serially. Additionally, most of the neighbors lie within the same pixel and the associated samples in order to improve the compression for packets within graphics surfaces that use an MSAA sampling mode with 8 samples per pixel.

Sample 533 is a neighbor of sample 534 and sample 537 is a neighbor of sample 538 in the first sub-packet 548. Similarly, in the second sub-packet 549 sample 541 is a neighbor of sample 542 and sample 545 is a neighbor of sample 546. Finally, sample 540 is the neighbor for samples 539, 544, and 541 and sample 544 is the neighbor for samples 543 and 545. Note that other predictor maps are possible that also minimize the dependencies between the first sub-packet 548 and the second sub-packet 549 and have most of the neighbors within the same pixel as the associated samples.

Figure 5D:
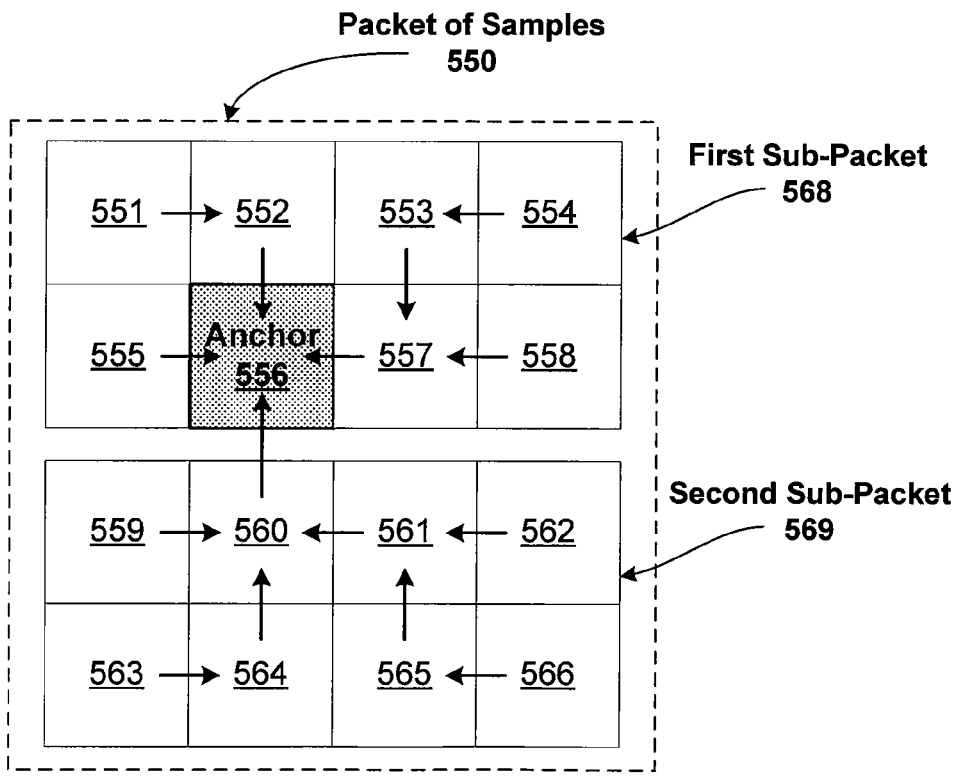
FIG. 5D is a diagram of another predictor map for a packet of samples, according to one embodiment of the present invention.

FIG. 5D is a diagram of another predictor map for a packet of samples 550, according to one embodiment of the present invention, where this predictor map is different than the predictor maps shown in FIGS. 5A and 5C. Again, only one sample in a first sub-packet 568, anchor 556 is defined as the neighbor of any of the samples in the second sub-packet 569 in order to minimize the dependencies between the first sub-packet 568 and the second sub-packet 569. The predictor map shown in FIG. 5D is configured for use when the MSAA sampling mode is 4 samples per pixel, where the first sub-packet 568 includes 4 samples of a first pixel (samples 551, 552, 555, and 556), 4 samples of a second pixel (samples 553, 554, 557, and 558) and the second sub-packet 549 includes 4 samples of a third pixel (samples 559, 560, 563, and 564) and 4 samples of a fourth pixel (samples 561, 562, 565, and 566).

The predictor map defines the sample 556 as the anchor and arrows between the samples define the transform that indicates a neighbor sample for each of the other (non-anchor) samples. For the predictor map shown in FIG. 5D, sample 552 is a neighbor for sample 551, sample 553 is a neighbor for sample 554, sample 557 is a neighbor for sample 558, and 536 (anchor) is a neighbor for samples 552, 555, 557, and 560. Similarly, in the second sub-packet 569, sample 560 is a neighbor of samples 559, 561, and 564. Sample 561 is a neighbor of samples 562 and 565, sample 565 is a neighbor for sample 566, and sample 564 is a neighbor for sample 563.

Only one sample in a first sub-packet 568, anchor 556 is defined as the neighbor of any of the samples in the second sub-packet 569 in order to minimize the dependencies between the first sub-packet 568 and the second sub-packet 569. Therefore, the first sub-packet 568 and the second sub-packet 569 may be computed in parallel or serially. Additionally, most of the neighbors lie within the same pixel and the associated samples in order to improve the compression for packets within graphics surfaces that use an MSAA sampling mode with 4 samples per pixel. Note that other predictor maps are possible that also minimize the dependencies between the first sub-packet 568 and the second sub-packet 569 and have most of the neighbors within the same pixel as the associated samples.

Figure 6A:
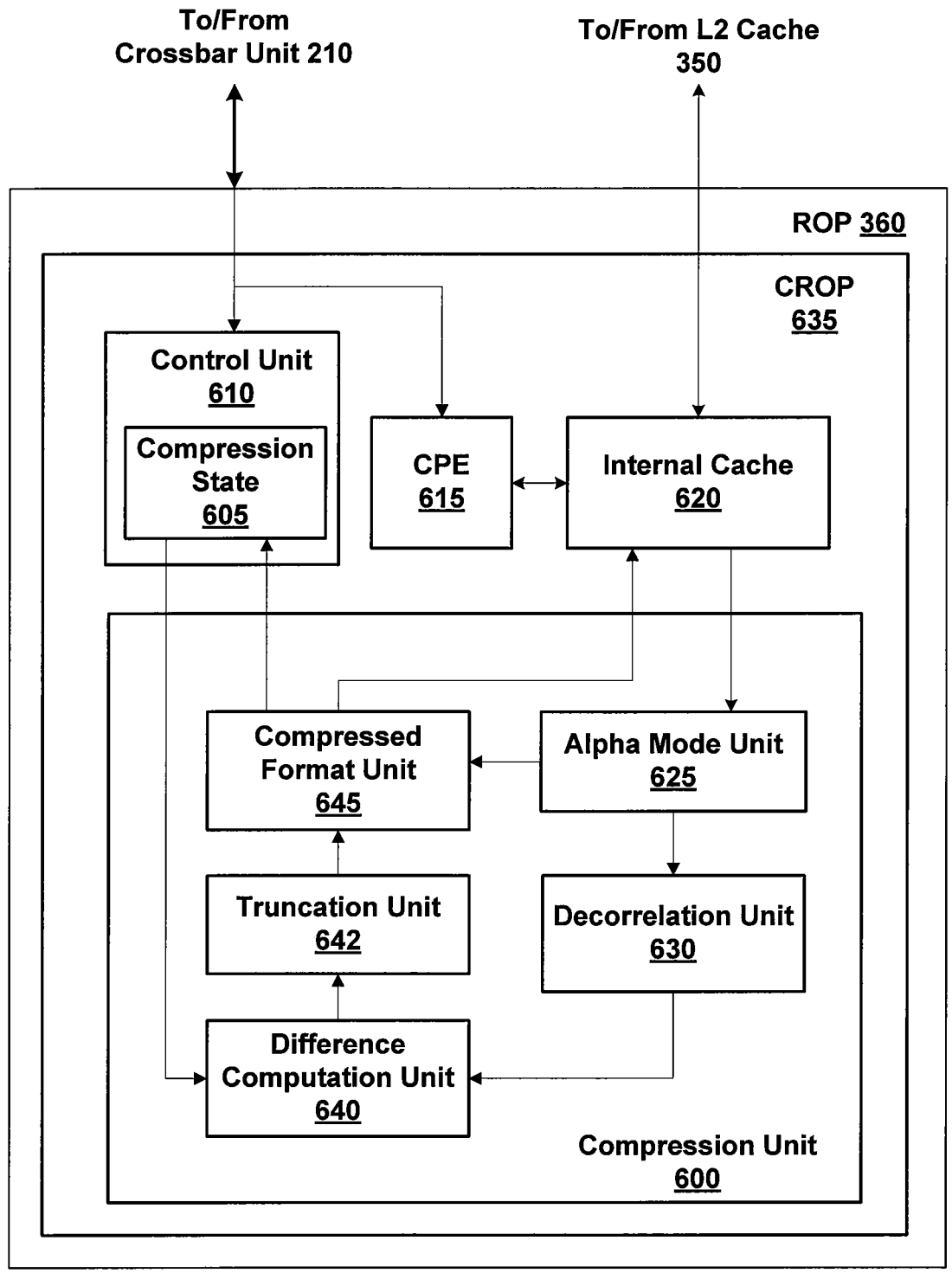
FIG. 6A is a block diagram of a portion of the raster operations unit of FIG. 3B, according to one embodiment of the present invention.

FIG. 6A is a block diagram of a portion of the ROP 360 of FIG. 3B, according to one embodiment of the present invention. The ROP 360 includes a color raster operations unit (CROP) 635, and the CROP 635 includes a control unit 610, internal cache 620, and a compression unit 600. In operation, the CROP 635 performs color raster operations, including compression of color data written to and decompression of color data read from L2 cache 350 via the internal cache 620. The CROP 635 may also include a color processing engine (CPE) 615, and a read interface and a write interface (not shown), and the like.

When performing color raster operations, the CROP 365 may perform single source blending or dual source blending. The source data is received by CROP 635 from the GPCs 208. For single source blending, control unit 610 first determines whether additional data (referred to herein as "destination data") is needed to perform the color raster operation on the source data stored in the internal cache 620. The internal cache 620 may be configured to store a tile of pixel data, where a tile includes one or more packets of color data. A packet includes a fixed number of bits and a tile may include a fixed number of bits or a fixed number of pixels. If the destination data is not needed, then control unit 610 determines whether each packet is partially or fully covered by the source data. Packets that are only partially covered the source data cannot be compressed by the compression unit 600. Packets that are fully covered by the source data are input to the compression unit 600.

In some embodiments, source data may be coalesced in the internal cache 620 so that source data for two or more primitives that each partially cover the tile are aggregated to produce source data that fully covers one or more packets in the tile. When a MSAA sampling mode with many samples is used to produce the source data, a single color value is used for multiple samples. When a MSAA sampling mode with few samples or a SSAA sampling mode is used to produce the source data, compressing the source data may significantly reduce the size of the source data.

If the destination data is needed, and is available in the internal cache 620, then the source data and the destination data is transmitted to CPE 615 to blend the destination data and the source data and produce color data. The color data is then stored in the internal cache 620. Fully covered packets are output to the compression unit 600 and processed, based on the compression state 605, to produce output color data packets. Fully covered packets that can be compressed without loss are output as output color data packets and the original color data (uncompressed) is output as compressed output color data packets for fully covered packets that cannot be compressed without loss. The compression unit 600 writes output packets including compressed color data to the internal cache 620. In some embodiments the output color data (compressed or not) may be further compressed within the CROP 635 or the L2 cache unit 350 using other techniques.

If the destination data is needed and not available in the internal cache 620, then the control unit 610 first transmits a read request to the L2 cache unit 350 requesting the destination data. The source data is buffered until the destination data is retrieved from the L2 cache unit 350. The L2 cache unit 350 returns the requested destination data to a decompression unit (not shown) that optionally decompresses the requested destination data based on the compression state 605. The color data is then stored in the internal cache 620. The decompressed destination data and the source data are then blended to produce the color data for a tile. Fully covered packets are output to the compression unit 600 which attempts to losslessly compress the color data using a predictor map that is selected based on the compression state 605 and transmits output packets with compressed color data to the internal cache 620 for storage in the destination graphics surface via L2 cache unit 350.

The compression state 605 is stored in the control unit 605 and includes information specifying the compression format of different render targets, e.g., graphics surfaces, stored in graphics memory. The compression state 382 also stores information specifying the color depth, color format, and pixel sample mode for each render target. Examples of some possible color depth values include 8, 16, 24, 32, 64, 128 bits per sample of a pixel, each sample may contain up to four channels. The channels may represent red, green, blue, alpha, luminance, chrominance, saturation, and the like. The different channels may be represented in different formats, such as signed or unsigned integer or floating point values. Finally, different sampling modes specify one or more sub-pixel samples per pixel and positions of the sub-pixel samples within the pixel as well as the number of color values that are shared between two or more samples.

The compression unit 600 is configured to compress packets of color data in order to reduce the amount of color data that is stored in portions of graphics memory that are allocated to graphics surfaces and transmitted between the graphics memory and a PPU 202. The compression unit 600 includes an alpha mode unit 625, a decorrelation unit 630, a difference computation unit 640, a truncation unit 642, and a compressed format unit 645. The alpha mode unit 625 determines an alpha mode for an output packet of compressed color data by comparing the alpha values for the samples within the packet. When the alpha values are either all zero or all one, a single bit in the output packet encodes the alpha values. When the alpha values all equal a single value that is not zero or one, the single alpha value in the output packet encodes the alpha values. When two or more alpha values are different, an alpha value is encoded for each sample in the output packet. The alpha mode unit 625 outputs the alpha mode, e.g., 1-bit per packet, 1 alpha per packet, or 1 alpha per sample, to the compressed format unit 645 in order to select one or more compressed color data formats.

The decorrelation unit 630 receives the color data for the packet from the alpha mode unit 625, including either a single alpha for the packet or an alpha for each sample. Since the color channels for a primitive tend to all be either bright or dim at the same time, some redundancy may be removed by computing the difference between the red and green channels and the difference between the blue and green channels. The differences are likely to be represented in fewer bits than the red and blue channels. The following equations may be used to compute decorrelated color components R', G', and B' for the packet:

$$R'=G-R,$$

$$G'=G, \text{ and}$$

$$B'=G-B.$$

The alpha channel may also be decorrelated by computing a difference between the alpha and one of the other channels when the alpha mode is 1 alpha per sample, e.g., A'=G−A or B−A, or R−A. The compression state 605 may be used to control whether or not the alpha channel is decorrelated for each graphics surface and which other channel is used to decorrelate the alpha channel.

The difference computation unit 640 receives the decorrelated color values for the packet from the decorrelation unit 630. The difference computation unit 640 also receives a predictor map for the packet, where the predictor map is selected based on the sampling mode specified for the destination graphics surface that is stored in the compression state 605. The difference computation unit 640 calculates per-channel differences between each neighboring sample and the other samples to produce difference samples for the packet. A difference sample is not computed for the anchor sample since the anchor is represented exactly, i.e., by the computed per-channel decorrelated color values.

The difference samples and the anchor for the packet are output by the difference computation unit 640 to the truncation unit 642. The truncation unit 642 truncates each channel of each difference sample in the packet by collapsing the (most significant) leading bits into a single bit. For example, when neighbor N=8 predicts sample S=17, the corresponding difference sample, D is computed as 8−17=−9 which is 0xf7 in hexadecimal format and 1111 0111 in binary format. The four leading 1s can be collapsed into a single leading 1, such that D is truncated from 8 bits to only 5 bits (10111). Note that the difference samples are computed using two's complement math and that floating point values may be subtracted in the same manner as fixed point values.

The truncation unit 642 outputs the anchor and truncated difference samples for the packet to the compressed format unit 645. The compressed format unit 645 tests the truncated difference samples against one or more compressed color data formats to determine whether or not the truncated difference samples can fit in a compressed color data format. When the alpha, anchor, and truncated difference samples can fit in one of the one or more compressed color data formats, the packet can be compressed without loss. Otherwise, the packet cannot be compressed without loss and the original color data for the packet is retained in the internal cache 620.

TABLE 1 illustrates examples of field widths of a first compressed color data format for the different alpha modes, where A2 is the anchor field and D0-8 are the sample fields for the output packet. This is for a 16 bit per channel format.

TABLE 1

| | 1b Alpha per Tile | | | | | 16b Alpha per Tile | | | | | Alpha per Pixel | | | | |
|---|---|---|---|---|---|---|---|---|---|---|---|---|---|---|---|
| | R' | G | B' | A | Total | R' | G | B' | A | Total | R' | G | B' | A | Total |
| A2 | 13 | 16 | 14 | 0 | 43 | 13 | 16 | 13 | 0 | 42 | 13 | 16 | 13 | 16 | 58 |
| D0 | 9 | 11 | 10 | 0 | 30 | 9 | 10 | 9 | 0 | 28 | 6 | 8 | 6 | 8 | 28 |
| D1 | 9 | 11 | 10 | 0 | 30 | 9 | 10 | 9 | 0 | 28 | 6 | 8 | 6 | 8 | 28 |
| D3 | 9 | 11 | 10 | 0 | 30 | 9 | 10 | 9 | 0 | 28 | 6 | 8 | 6 | 8 | 28 |
| D4 | 9 | 11 | 10 | 0 | 30 | 9 | 10 | 9 | 0 | 28 | 6 | 8 | 6 | 8 | 28 |
| D5 | 9 | 11 | 10 | 0 | 30 | 9 | 10 | 9 | 0 | 28 | 6 | 8 | 6 | 8 | 28 |
| D6 | 9 | 11 | 10 | 0 | 30 | 9 | 10 | 9 | 0 | 28 | 6 | 8 | 6 | 8 | 28 |
| D7 | 9 | 11 | 10 | 0 | 30 | 9 | 10 | 9 | 0 | 28 | 6 | 8 | 6 | 8 | 28 |
| Alpha | | | | | 1 | | | | | 16 | | | | | 0 |
| | | | | | 254 | | | | | 254 | | | | | 254 |

TABLE 2 illustrates examples of field widths of a second compressed color data format for the different alpha modes, where A2 is the anchor field and D0-8 are the sample fields for the output packet.

TABLE 2

| | 1b Alpha per Tile | | | | | 16b Alpha per Tile | | | | | Alpha per Pixel | | | | |
|---|---|---|---|---|---|---|---|---|---|---|---|---|---|---|---|
| | R' | G | B' | A | Total | R' | G | B' | A | Total | R' | G | B' | A | Total |
| A2 | 15 | 15 | 13 | 0 | 43 | 14 | 16 | 12 | 0 | 42 | 11 | 15 | 11 | 14 | 51 |
| D0 | 10 | 11 | 9 | 0 | 30 | 10 | 9 | 9 | 0 | 28 | 7 | 8 | 7 | 7 | 29 |
| D1 | 10 | 11 | 9 | 0 | 30 | 10 | 9 | 9 | 0 | 28 | 7 | 8 | 7 | 7 | 29 |
| D3 | 10 | 11 | 9 | 0 | 30 | 10 | 9 | 9 | 0 | 28 | 7 | 8 | 7 | 7 | 29 |
| D4 | 10 | 11 | 9 | 0 | 30 | 10 | 9 | 9 | 0 | 28 | 7 | 8 | 7 | 7 | 29 |
| D5 | 10 | 11 | 9 | 0 | 30 | 10 | 9 | 9 | 0 | 28 | 7 | 8 | 7 | 7 | 29 |
| D6 | 10 | 11 | 9 | 0 | 30 | 10 | 9 | 9 | 0 | 28 | 7 | 8 | 7 | 7 | 29 |

TABLE 2-continued

| | 1b Alpha per Tile | | | | | 16b Alpha per Tile | | | | | Alpha per Pixel | | | | |
|---|---|---|---|---|---|---|---|---|---|---|---|---|---|---|---|
| | R' | G | B' | A | Total | R' | G | B' | A | Total | R' | G | B' | A | Total |
| D7 | 10 | 11 | 9 | 0 | 30 | 10 | 9 | 9 | 0 | 28 | 7 | 8 | 7 | 7 | 29 |
| Alpha | | | | | 1 | | | | | 16 | | | | | 0 |
| | | | | | 254 | | | | | 254 | | | | | 254 |

In other embodiments, more than one predictor map may be selected and the difference computation unit 640 and truncation unit 642 may be configured to determine which of the predictor maps yield the best compression for each packet. The compressed data formats may be configured to include a predictor map identifier field to encode which of the one or more predictor maps is used to encode the color data for the output packet.

Figure 6B:
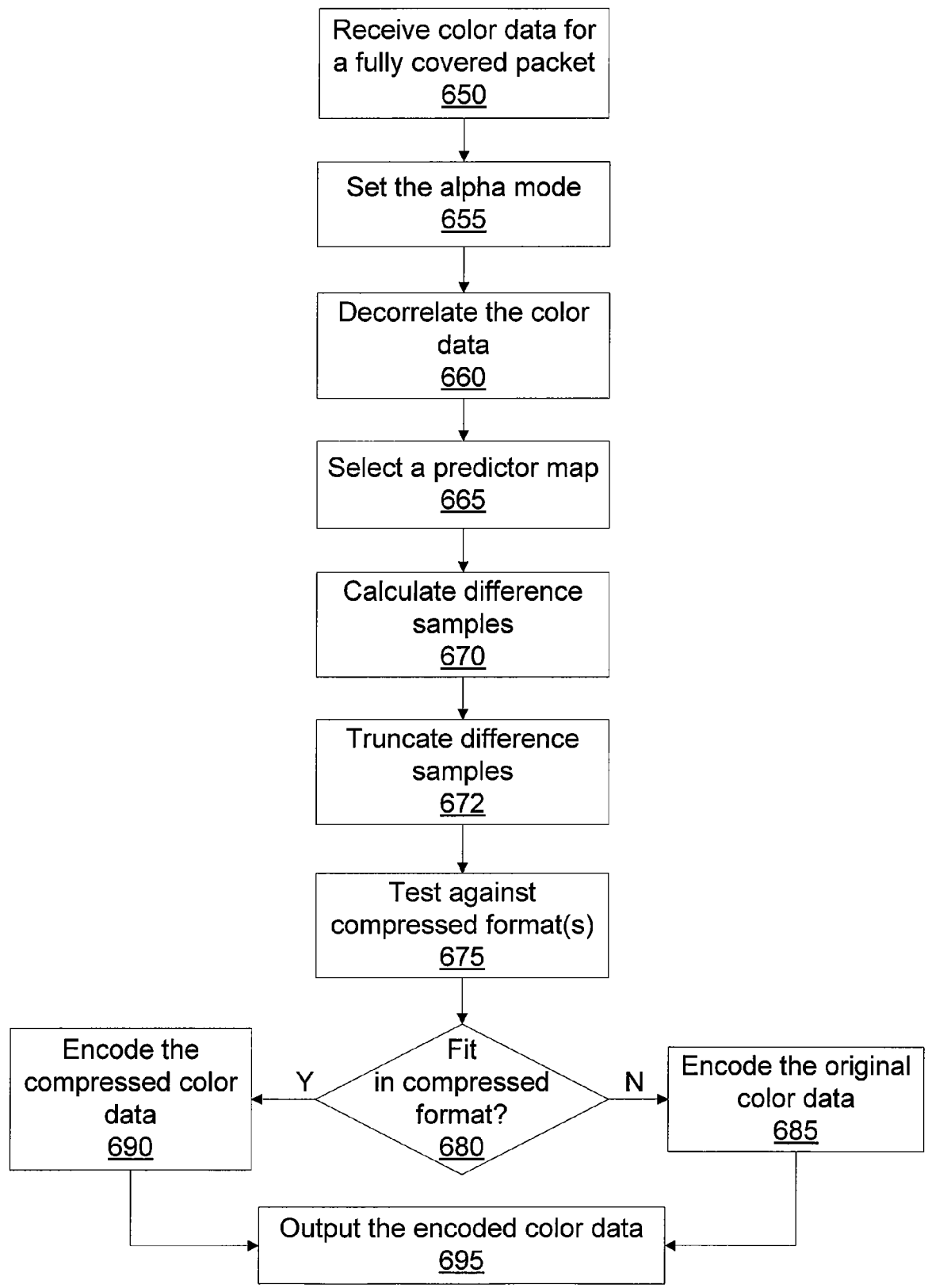
FIG. 6B is a flow diagram of method steps for compressing color data, according to one embodiment of the present invention.

FIG. 6B is a flow diagram of method steps for compressing color data, according to one embodiment of the present invention. At step 650 the compression unit 375 receives the original color data for a fully covered packet. At step 652 the alpha mode for the packet is determined by the alpha mode unit 625 and set for the output packet. At step 660 the color data is decorrelated by the decorrelation unit 630. At step 665 a predictor map is selected based on the sampling mode specified for the destination graphics surface that the packet will be written to. The predictor map is provided to the difference computation unit to identify the anchor and to compute the difference samples. At step 670 the per-channel differences between each neighboring sample and the other (non-anchor) samples are computed by the difference computation unit 640 to produce difference samples. At step 672 the difference samples are truncated by the truncation unit 642 to produce truncated difference samples. At step 680 the compressed format unit 645 determines if the truncated difference samples will fit in a compressed color data format, i.e., if the packet can be compressed without loss. If, the packet can be compressed without loss, then at step 690 the truncated difference samples and the anchor are encoded in the compressed color data format by the compressed format unit 645 to produce output color data for the packet. Otherwise, at step 685 the truncated difference samples and the anchor are discarded and the original color data for the packet is retained as the output color data. At step 695 the output color data is stored in a portion of memory allocated to the graphics surface.

When the color data for fully covered packets can be compressed without loss, the compressed color data is output for storage in the graphics surface. When the color data cannot be compressed without loss, the original color data is output for storage in the graphics surface. The predictor map that is used to compress the color data may be selected based on the compression state and a variety of compressed color data formats may be defined for the compressed color data. Overall, the bandwidth needed to access the color data in the graphics surface is reduced when the color data is compressed and no visual artifacts are introduced since the compression is lossless.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A method for compressing color data, the method comprising:
   receiving the color data for a packet including multiple samples;
   selecting a predictor map based on a sampling mode of a graphics surface, wherein the predictor map identifies one of the multiple samples in the packet as an anchor that is represented exactly and a neighboring sample for each one of the other samples in the packet;
   calculating per-channel differences between each neighboring sample and the other samples in the packet to produce difference samples;
   truncating the difference samples to produce truncated difference samples;
   encoding the truncated difference samples and the anchor in a compressed color data format to produce output color data for the packet; and
   storing the output color data in a portion of memory allocated to the graphics surface.

2. The method of claim 1, wherein the step of encoding comprises:
   selecting the compressed color data format as the output color data when the truncated difference samples fit within the compressed color data format; and
   selecting the color data as the output color data when the truncated difference samples do not fit within the compressed color data format.

3. The method of claim 1, wherein the step of encoding comprises:
   determining that the truncated difference samples fit within a first compressed color data format of multiple compressed color data formats; and
   selecting the first compressed color data format as the compressed color data format.

4. The method of claim 1, wherein the color data includes alpha values, and further comprising selecting the compressed color data format based on a number of bits needed to encode the alpha values.

5. The method of claim 1, wherein the color data includes alpha values and the output color data format includes only a single bit that encodes the alpha values when all of the alpha values are either zero or one.

6. The method of claim 1, wherein the color data includes alpha values and the output color data format includes only a single output alpha value that encodes the alpha values when all of the alpha values are equal.

7. The method of claim 1, wherein the anchor is a sample that is not positioned along a perimeter of a footprint of the packet in screen space.

8. The method of claim 1, wherein the neighbor of each sample of the other samples in the packet is closer to the anchor than the sample.

9. The method of claim 1, further comprising, prior to the calculating, decorrelating the color channels for each sample in the packet.

10. The method of claim 1, wherein channels of the multiple samples are represented in a signed 16 bit floating point format.

11. The method of claim 1, wherein channels of the multiple samples are represented in an unsigned 16 bit floating point format that includes a bias.

12. A non-transitory computer-readable medium storing instructions that, when executed by a processor, cause the processor to compress color data, by performing the steps of:
    receiving the color data for a packet including multiple samples;
        selecting a predictor map based on a sampling mode of a graphics surface, wherein the predictor map identifies one of the multiple samples in the packet as an anchor that is represented exactly and a neighboring sample for each one of the other samples in the packet;
    calculating per-channel differences between each neighboring sample and the other samples in the packet to produce difference samples;
    truncating the difference samples to produce truncated difference samples;
    encoding the truncated difference samples and the anchor in a compressed color data format to produce output color data for the packet; and
    storing the output color data in a portion of memory allocated to the graphics surface.

13. A system for compressing color data, the system comprising:
    a processor configured to:
    receive the color data for a packet including multiple samples;
        select a predictor map based on a sampling mode of a graphics surface,
        wherein the predictor map identifies one of the multiple samples in the packet as an anchor that is represented exactly and a neighboring sample for each one of the other samples in the packet;
    calculate per-channel differences between each neighboring sample and the other samples in the packet to produce difference samples;
    truncate the difference samples to produce truncated difference samples;
    encode the truncated difference samples and the anchor in a compressed color data format to produce output color data for the packet; and
    store the output color data in a portion of a frame buffer allocated to the graphics surface.

14. The system of claim 13, further comprising a non-transitory memory storing instructions that, when executed by the processor, configures the processor to:
    receive the color data;
    select the predictor map;
    calculate the per-channel differences;
    truncate the difference samples;
    encode the truncated difference samples; and
    store the output color data.

15. The system of claim 13, wherein the processor is further configured to:
    select the compressed color data format as the output color data when the truncated difference samples fit within the compressed color data format; and
    select the color data as the output color data when the truncated difference samples do not fit within the compressed color data format.

16. The system of claim 13, wherein the processor is further configured to:
    determine that the truncated difference samples fit within a first compressed color data format of multiple compressed color data formats; and
    select the first compressed color data format as the compressed color data format.

17. The system of claim 13, wherein the color data includes alpha values, and the processor is further configured to select the compressed color data format based on a number of bits needed to encode the alpha values.

18. The system of claim 13, wherein the anchor is a sample that is not positioned along a perimeter of a footprint of the packet in screen space.

19. The system of claim 13, wherein the neighbor of each sample of the other samples in the packet is closer to the anchor than the sample.

20. The system of claim 14, wherein the processor is further configured to:
    split the packet into two sub-packets along a boundary and serially perform the calculation of the per-channel differences, the truncation of the difference samples, and the encoding of the truncated difference samples and the anchor for each sub-packet.

21. The system of claim 20, wherein the processor is further configured to select the predictor map that defines only one sample in a first sub-packet as the neighbor of only one sample in a second sub-packet.

* * * * *